United States Patent [19]

Jokinen

[11] Patent Number: 5,774,813
[45] Date of Patent: Jun. 30, 1998

[54] METHOD AND APPARATUS FOR CONTROLLING THE POWER CONSUMPTION OF AN ELECTRONIC DEVICE

[75] Inventor: Harri Jokinen, Hiisi, Finland

[73] Assignee: Nokia Mobile Phones Ltd., Salo, Finland

[21] Appl. No.: 877,940

[22] Filed: Jun. 18, 1997

Related U.S. Application Data

[63] Continuation of Ser. No. 484,940, Jun. 8, 1995, abandoned.

[30] Foreign Application Priority Data

Jun. 10, 1997 [FI] Finland .................................. 942752

[51] Int. Cl.[6] .............................. H04B 1/38; H04M 1/00
[52] U.S. Cl. .......................................... 455/574; 455/343
[58] Field of Search .................................. 455/575, 574, 455/38.3, 343, 127; 307/29, 38–39, 18, 40–41, 112–113, 125–126, 116, 139, 42, 48; 323/282, 285, 224–225; 363/65, 69; 320/18, 56; 370/311

[56] References Cited

U.S. PATENT DOCUMENTS

| | | | |
|---|---|---|---|
| 4,451,773 | 5/1984 | Papthomas et al. | 307/48 |
| 4,659,942 | 4/1987 | Volp | 307/42 |
| 4,877,972 | 10/1989 | Sobhani et al. | 307/43 |
| 5,073,848 | 12/1991 | Steigerwald et al. | 307/29 |
| 5,239,275 | 8/1993 | Leitch | 455/127 |
| 5,266,838 | 11/1993 | Gerner | 307/29 |
| 5,268,593 | 12/1993 | Hayasaki | 307/125 |
| 5,291,542 | 3/1994 | Kivari et al. | 379/58 |
| 5,378,935 | 1/1995 | Korhonen et al. | 327/114 |
| 5,416,435 | 5/1995 | Jokinen et al. | 327/113 |

FOREIGN PATENT DOCUMENTS

WO 91/19357  12/1991  WIPO .

OTHER PUBLICATIONS

Finnish Office Action dated 31 Mar. 1995, Nokia Mobile Phones Ltd., Application No.: 942752.

*Primary Examiner*—Nguyen Vo
*Attorney, Agent, or Firm*—Perman & Green, LLP

[57] ABSTRACT

The invention relates to a method to reduce the power consumption of an electronic device comprising at least two voltage regulators. At least one of the regulators (REG2-REG4) is switched off, and the output of at least one regulator still switched on is connected to the output (OUT2-OUT4) of the at least one regulator switched off, in order to supply power to said at least one output (OUT2-OUT4).

15 Claims, 4 Drawing Sheets

METHOD AND APPARATUS FOR CONTROLLING THE POWER CONSUMPTION OF AN ELECTRONIC DEVICE

This application is a continuation of U.S. Pat. No. 08/484,940 filed on Jun. 8, 1995, now abandoned.

BACKGROUND OF THE INVENTION

This invention relates to a method and apparatus for controlling the power consumption of an electronic device comprising two voltage regulators.

Today a multitude of different battery powered devices are available to the consumer. These devices include, for example, mobile telephones, portable computers, portable telefax terminals, portable copying machines, portable oscilloscopes, portable hospital equipment, and so on. Here, a battery refers to any component which stores electrical energy, for example, a rechargeable battery, a disposable battery, or an accumulator.

In order to illustrate an application area and advantages of the invention relative to the prior art, consideration will now be given to a mobile telephone as an example of an electronic device.

A cellular telephone system, such as the GSM (Groupe Speciale Mobile), usually comprises a number of base stations, each providing service in a predefined geographical area or cell. Each base station broadcasts messages to the mobile telephones situated within the cell area. The mobile telephones comprise a microprocessor, a transceiver, and a decoder controlled by the microprocessor. In battery powered mobile telephones the battery will usually last, between charging, approximately eight hours when the telephone is in idle mode and approximately one to two hours in talk mode, in which the telephone transmits and receives data and/or speech.

The mobile telephone and the base station communicate via a radio path assigned to the mobile telephone network. The radio path conveys both speech and signalling information used to control the operation of the mobile telephones and their allocation to the radio path. In the GSM system for example, two frequency bands of 25 MHz each are reserved for the radio path on the 900 MHz band; the band 890–915 MHz is reserved for uplink communication in the direction from the mobile telephone to the base station (transmit frequency band), and 935–960 MHz is reserved for the downlink direction from the base station to the telephone (receive frequency band). These frequency bands are divided in 124 frequency channels at intervals of 200 kHz. Each frequency channel is further divided in eight time slots, i.e. the GSM system utilises time division multiple access (TDMA), where each mobile telephone is allocated one time slot for the transmission and reception, so that each frequency channel of 200 kHz can simultaneously serve eight telephones. Thus the GSM system has a total of 992 channels.

The GSM system, which is based on time division multiple access (TDMA) will not be described in greater detail here, because it is well known by a person skilled in the art, and the system is exactly specified in the so called GSM specifications and presented, for example, in the article M. R. L. Hodges: "The GSM radio interface", British Telecom Technological Journal, Vol. 8, No 1, 1990, p. 31–43, the contents of which is incorporated herein by reference.

In the GSM mobile system there is specified the concept of an idle mode, in which a mobile telephone listens to and reconstructs system information messages sent by the base station as well as listening for paging messages which prompts the telephone that a call is waiting. The paging message is a common concept in cellular mobile telephone systems, and is transmitted as an impulse by the base station indicating to the mobile telephone that there is a call waiting. In reply the mobile telephone responds to the base station in order to establish a communication link between the mobile telephone and the base station. In mobile telephones there is known a power saving mode, whereby certain circuits, such as the microprocessor circuits controlling the operation of the mobile telephone, are switched into a mode in which their power consumption is reduced. In this power saving mode clock frequencies are lowered, and some of the clocks are even stopped. European patent publication EP 473 465 presents a way to implement such a power saving mode.

Since in cellular mobile systems most messages transmitted by a base station to the mobile station are intended for a single mobile station, only a small number of all messages transmitted by the base station are intended for a specific mobile station. So as not to have the mobile stations continuously receive and decode all messages broadcast by the base station, the European patent publication EP 473 465 suggests, in order to save power, that the messages received by the mobile station are detected to find out whether a received message is intended for another mobile station, and in this case the battery power is lowered (the power saving mode is activated) until the next message broadcast by the base station is expected to arrive. Battery saving according to the publication EP 473 465 is based on the receiving of a two-part message, the first part indicating that this message is intended for another mobile station, and that the message for this other mobile station contains a second part which, according to the publication EP 473 465, it is not necessary to receive if the message is addressed to another mobile station. Thus the mobile station can switch a considerable part of its receiving circuits into the power saving mode until the next message possibly directed to this mobile station is expected to arrive. This power saving mode is controlled by a timing circuit, which may be programmed to contain the start time of an expected next message.

Most electronic devices require different supply voltages for different sections of the circuitry, and as a result voltage regulators are usually used to generate these different supply voltages. For circuits operating at the same voltage there can be other reasons for needing more than one voltage regulators. Some circuits, for example, require very precise regulated voltages while others can operate using less precise regulated voltages. Also, certain types of circuit need to be isolated from one another in order that they do not interfere; for example, analogue and digital circuits in a mobile phone. In these cases it is common to have separate voltage regulators for each circuit. A voltage regulator usually operates using a supply voltage from a voltage source, such as a battery. The voltage regulator comprises typically three sections: (i) a reference voltage source generating the reference voltage, (ii) a differential or error amplifier, and (iii) an admitting or output element, usually a transistor. A simplified diagram of a voltage regulator is shown in FIG. 1, where the reference voltage $V_{Ref}$ generated by the reference voltage source 1 is connected to first input 6 (non-inverting input) of the error amplifier 2. The output 8 of the error amplifier is connected to the base of the output transistor 3, and the collector of the output transistor 3 is connected as feedback to the second input 7 (inverting input) of the error amplifier 2. The emitter of the output transistor is connected to the supply voltage $V_{Bat}$ which may be, for example, a battery, and the output $V_{Out}$ of the voltage regulator is tapped from a junction 4 of part of the feedback loop between the transistor collector and the error amplifier feedback. A load 5, represented in FIG. 1 by a capacitor 5 is connected between this junction 4 and ground (GND) to stabilise the circuit so that it will not oscillate.

The power consumption of a voltage regulator is the sum of the power consumed by each voltage regulator section:

The power consumption of the reference voltage source is usually 10–500 µA. If there is more than one voltage regulator, then all voltage regulators usually use a common reference voltage source. In mobile telephones the power consumption is usually about 150 µA, including the buffers;

The base current of the output transistor, which is usually of the order of the output current of the voltage regulator divided by the transistor gain. Thus this current mainly depends on the current consumed by the load connected to the voltage regulator output;

The power consumption of the error amplifier. In a mobile telephone the error amplifier usually consumes about 100 µA.

The output current in the output line $V_{Out}$ also depends on the power consumption of the buffer stage of the error amplifier.

A single regulator may consume a significant amount of power during operation. Additionally, as electronic devices usually have several voltage regulators, to generate several different voltages, the combined power consumption of these voltage regulators form an increasingly significant contribution to the overall power consumption of the electronic device. This is particularly exemplified in mobile telephones operating in idle mode where the remainder of circuit functions within the telephone operate in a power saving mode. With the majority of circuits within the telephone becoming more efficient there exists a requirement for power saving modes in increasingly diverse components. However, despite the reduction of the power consumption in other circuits, the power consumption of the voltage regulators was not considered.

The functions of an electronic device, such as a radiotelephone, are generally divided in several sections, so that each section receives its supply voltage from a voltage regulator circuit of its own. Typically several such regulator circuits are then integrated in one IC circuit (e.g. 5 regulators in one IC circuit). Each voltage regulator circuit is dimensioned according to the maximum current occurring in the telephone's different operational modes. A consequence of this is that the quiescent current, or the basic current consumption which is independent of the output load, or the current consumption of the circuit when the load current is zero, will be proportional to the respective maximum current output ability.

The power consumption of a mobile phone varies substantially in different operational modes. In particular, some mobile phone systems exhibit an idle mode (a listening mode, where paging channels are listened to), in which the mobile telephone can operate in two states, an active state, when the mobile phone receives a paging message from the base station such that the power consumption of the circuits is relatively high, and a power down state, when the mobile phone waits for a paging message such that the power consumption of the circuits is relatively low. For example, in a GSM telephone the length of the active state is in the order of 40 ms, and the power down state between the active states may be of the order of 2 seconds. In this situation all circuits, or at least the main parts of the respective circuits, require a supply voltage during the power down state, so that each voltage regulator must remain switched on in order to supply the circuits during the power down state.

SUMMARY OF THE INVENTION

According to a first aspect of the present invention there is provided a method for supplying a regulated voltage in an electronic device comprising first and second voltage regulators, wherein during an active state the first and second voltage regulators provide respectively first and second regulated voltage outputs for the electronic device and in a power down state the second voltage regulator provides the first regulated voltage output, and according to a second aspect of the present invention there is provided an electronic device comprising first and second voltage regulators, operable during an active state such that the first and second voltage regulators provide respectively first and second regulated voltage outputs for the electronic device, and operable during a power down state such that the second voltage regulator provides the first regulated voltage output.

According to third aspect of the invention there is provided a method to reduce the power consumption of an electronic device comprising at least two voltage regulators, characterised in that at least one of the regulators is switched off, and that the output of at least one regulator still switched on is connected to the output connection of the at least one regulator which was switched off, in order to supply power to said at least one output connection.

With the aid of the invention it is simple to reduce the power consumption of an electronic device comprising at least two regulators by switching off at least one regulator and by connecting the output of a voltage regulator still switched on to the output connection of a regulator which was switched off during power down states when the normal supply of power from the regulator is not required. This situation can occur when the electronic device is in a generally passive mode, but also when a circuit in the device, supplied by a certain regulator, is switched into a power saving mode. The invention is applicable to electronic devices of different types, particularly in battery powered devices, such as mobile phones, portable computers, portable telefax terminals, portable copying machines, portable oscilloscopes and portable hospital, whereby it is possible to increase the operational time of the battery.

An advantage of the present invention is that the method and apparatus provides a means with which the power consumption of an electronic device, preferably a battery powered device can be reduced in order to increase the operational time of the battery From an application of the invention it is possible to reduce the power consumption of an electronic device comprising several voltage regulators by switching off at least one regulator, and by connecting the output of at least one voltage regulator still switched on, to the output connection of a regulator which was switched off in order to supply power to the output connection.

Preferably the power consumption of the regulators and thus of the device is reduced by switching off all except one of the regulators of the electronic device for a period known by the electronic device during which the circuits supplied by the regulators are in a mode consuming a low current. At the same time this one regulator still switched on is connected to supply the outputs of the switched off regulators, thus supplying in addition to its own voltage a voltage to those circuits which would otherwise have been supplied by the switched off regulators. Preferably the voltage regulators provide substantially the same voltage. The regulators of the electronic device may be integrated on a single integrated circuit and can be arranged so that each regulator comprises a differential amplifier and an output transistor, and all differential amplifiers receive a reference voltage from a common reference voltage source. Switching off the regulators and connecting the output of one regulator still switched on to supply the other outputs is possible during such periods when the electronic device is in a passive mode, or when it is on, and is not actively performing its normal functions. In a mobile phone this switching off may be effected during the power down states between the active states, because during the power down state the net power consumption of all circuits is negligible compared to the power supply ability of a single voltage regulator. Also in the power down states regulated voltages of less accuracy may be suitable for certain circuits, and circuits which interfere in the active state may no longer interfere. The transition into this power down state may be realised by a control signal supplied by the timing sections of the electronic device, whereby the timing signal can be defined to be an active signal only during the power down state (the timing circuit will know when the electronic device, such as a mobile phone, will be required to be in the power down state). A reduction of the power consumption is achieved as a result of a decrease in the idle current of the regulator circuits which in turn results because the quiescent current of only one regulator exists instead of, for example, five regulator quiescent currents. The reduction of this power consumption will in turn have a dramatic effect on the whole, because the length of the power down state is substantial when compared to the active period (ratio of power down state active state to can be 50:1 or possibly 100:1).

An electronic device and voltage regulator circuit in accordance with the invention are suitably provided with at least one controllable switch connected between the output of at least one regulator without a connection to an intermediate input interface and the output of at least one regulator having an intermediate input connected to the interface, and that the switch has two positions, whereby it is open in the first position having no connection between said outputs, and closed in the second position having a connection between the output of said at least one regulator having an intermediate input connected to the interface and the output of said at least one regulator without intermediate input, and that the connected intermediate inputs of the regulators and the control inputs of the switches are interconnected to connect the same control signal to both said inputs at the same moment in order to switch the output voltage of the at least one regulator having no intermediate input connected to the interface to be the output of said at least one regulator having the intermediate input connected to the interface at the same time as said at least one regulator with an intermediate input connected is switched off.

The device may be characterised in that all regulators except one regulator are provided with an interface to an auxiliary intermediate input supplied with a signal, which can switch off said all other regulators except one, that the device is provided with a number of controllable switches corresponding to the number of said other regulators and being connected between the output of said one regulator without connection to the intermediate input and the of each of the regulators having an intermediate input connected to the interface, and that the switch has two positions, whereby it is open in the first position having no connection between said outputs, and closed in the second position providing a connection between the output of said at least one regulator, which has an intermediate input connected to the interface, and the output of each of said at least one regulator without intermediate input, and that the intermediate inputs of the regulators connected to the interface and the control inputs of the switches are interconnected to connect the same control signal to both said inputs at the same moment in order to switch the output voltage of the at least one regulator having no intermediate input connected to the interface to be the output of said at least one regulator having the intermediate input connected to the interface, at the same time as said at least one regulator with an intermediate input connected to the interface is switched off.

The device may be characterised in that it comprises a timing and controlling device, which generates through said interfaces to said intermediate inputs and to said switched a control signal in order to switch off and on the with the intermediate inputs connected to the interface and correspondingly to close and open the switches.

In accordance with another aspect of the invention there is provided a voltage regulator circuit to regulate the voltage supplied from a voltage source the circuit comprising at least two voltage regulators, of which at least one is provided with an interface to an intermediate input supplied with a signal which can switch off said at least one regulator, characterised in that the circuit is provided with at least one controllable switch, which is connected between the output of at least one regulator without a connection to an intermediate input and the output of at least one regulator having an intermediate input connected to the interface, and that the switch has two positions, whereby it is open in the first position having no connection between said outputs, and closed in the second position providing a connection between the output of said at least one regulator, which has an intermediate input connected to the interface, and the output of said at least one regulator without intermediate input, and that the intermediate inputs of the regulators connected to the interface and the control inputs of the switches are interconnected to connect the same control signal to both said inputs at the same moment in order to switch the output voltage of the at least one regulator having no intermediate input connected to the interface to be the output of said at least one regulator having the intermediate input connected to the interface, at the same time as said at least one regulator with an intermediate input connected to the interface is switched off.

The voltage regulator circuit may be characterised in that all regulators except one regulator are provided with an interface to an auxiliary intermediate input supplied with a signal, which can switch off said all other regulators except one, that the device is provided with a number of controllable switches corresponding to the number of said other regulators and being connected between the output of said one regulator without connection to the intermediate input and the outputs of each of the regulators having an intermediate input connected to the interface, and that the switch has two positions, whereby it is open in the first position having no connection between said outputs and closed in the second position providing a connection between the output of said at least one regulator, which has an intermediate input connected to the interface, and the output of each of said at least one regulator without intermediate input, and that the intermediate inputs of the regulators connected to the interface and the control inputs of the switches are interconnected to connect the same control signal to both said inputs at the same moment in order to switch the output voltage of the at least one regulator having no intermediate input connected to the interface to be the output of said at least one regulator having the intermediate input connected to the interface, at the same time as said at least one regulator with an intermediate input connected to the interface is switched off.

BRIEF DESCRIPTION OF THE DRAWINGS

Embodiments of the invention will now be described, by way of example with reference to the accompanying drawings, in which.

DETAILED DESCRIPTION OF THE INVENTION

Figure 1:
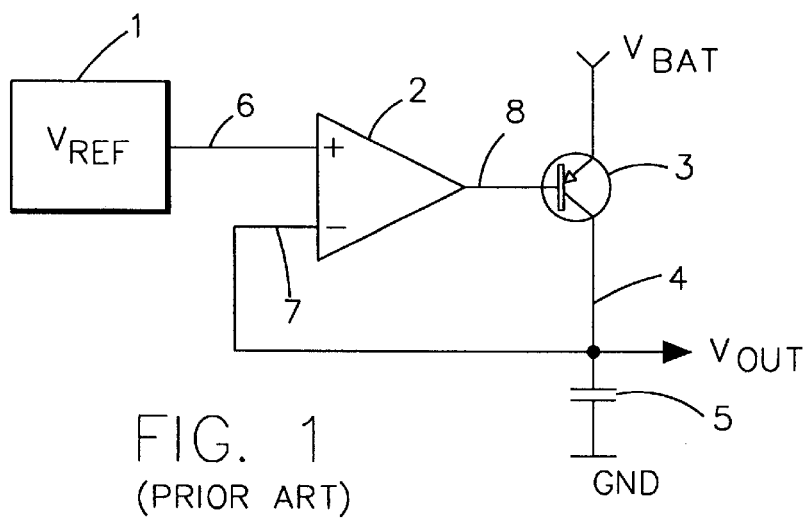
FIG. 1 is a circuit diagram of a general voltage regulator.
Figure 2:
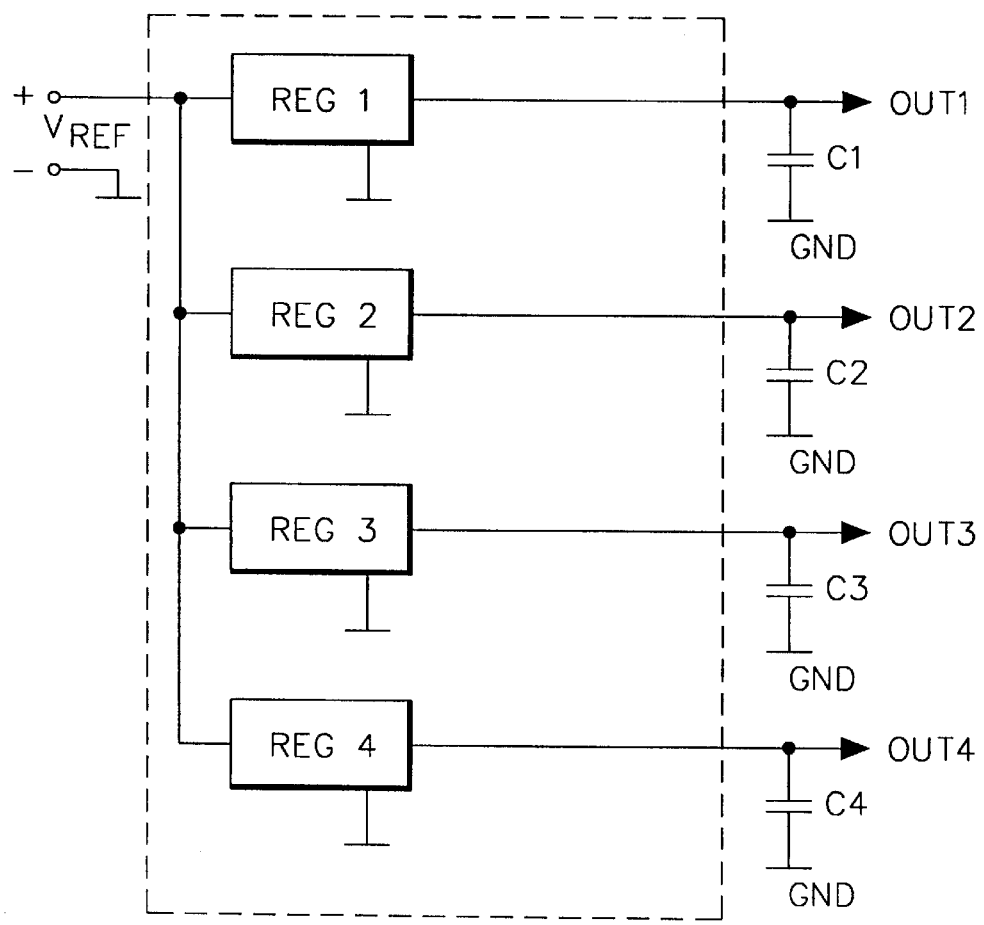
FIG. 2 is a block diagram of a known combination of voltage regulators.
Figure 3:
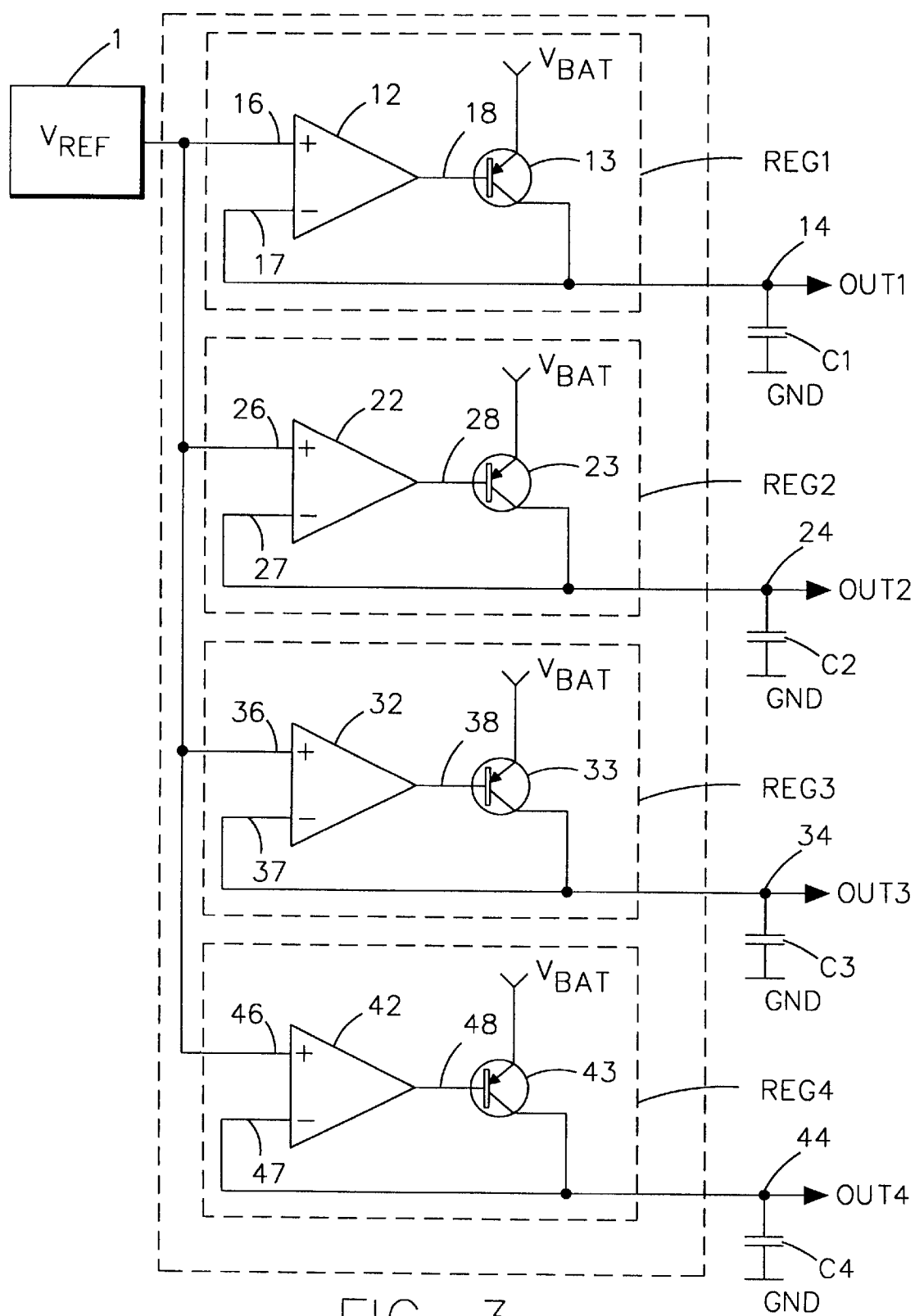
FIG. 3 is a circuit diagram of a known combination of regulators.

FIG. 2 shows a block diagram and FIG. 3 a circuit diagram of prior art practice for implementing a plurality of voltage regulators in an electronic device. The voltage regulators REG1–REG4 can be integrated on, for example, one integrated circuit and are usually implemented such that each regulator REG1–REG4 includes a differential amplifier 12, 22, 32, 42 and an output transistor 13, 23, 33, 43. Each differential amplifier receives a reference voltage from a common reference voltage source $V_{Ref}$ which can be, for example, a battery of the electronic device. In the arrangement of FIG. 2 there is shown four regulators realised in this way, each of them providing a single voltage output OUT1–OUT4. With the power consumption figures mentioned previously the regulators REG1–REG4 in FIGS. 2 and 3 when fitted in a mobile telephone would consume a quiescent of approximately 150 $\mu$A+4×100 $\mu$A=550 $\mu$A.

Figure 4:
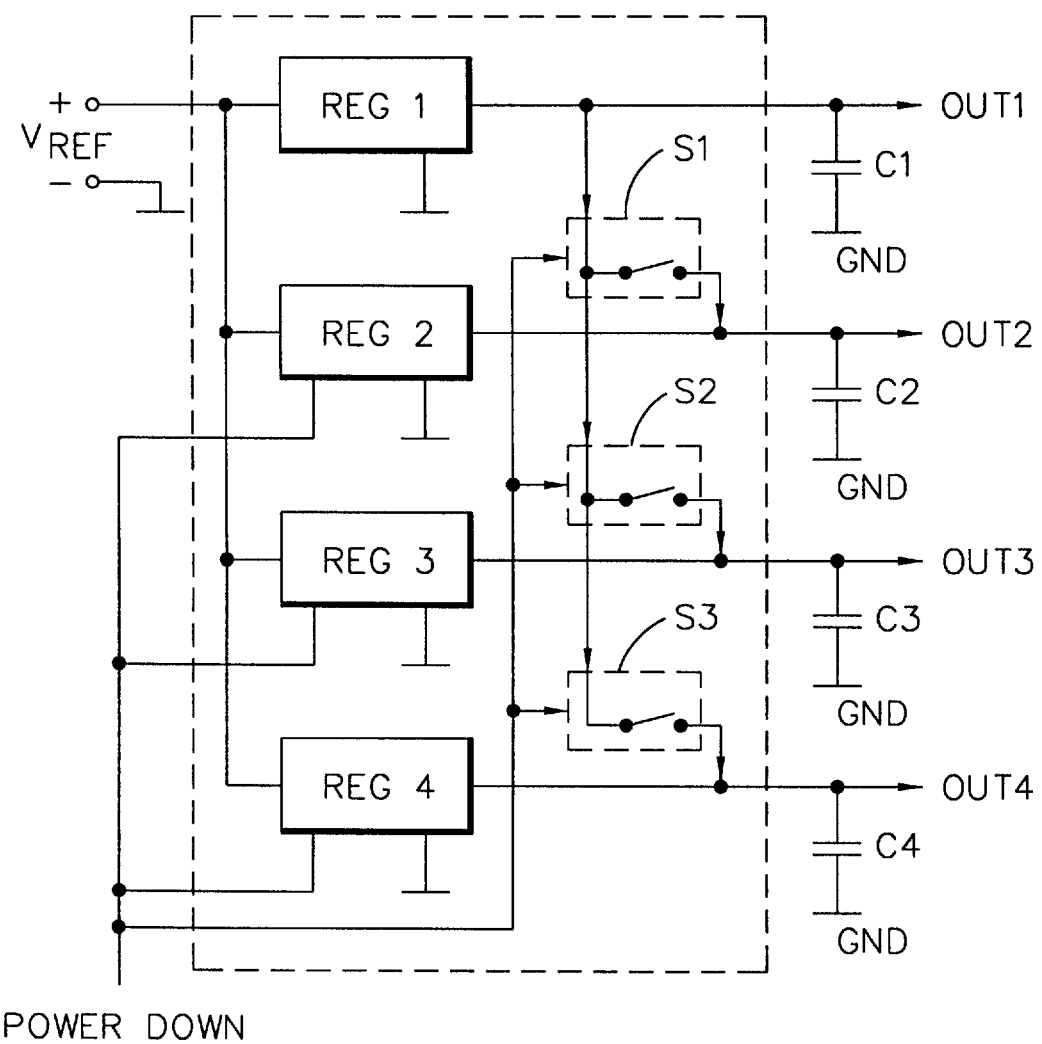
FIG. 4 is a block diagram of a combination of regulators in accordance with the invention.

FIG. 4 is a block diagram of an arrangement of voltage regulator in accordance with the invention for reducing the power consumption of an electronic device. FIG. 4 illustrates, by way of example, an improvement over FIG. 2, in accordance with the invention. The power consumed by this improved arrangement is reduced by switching off the regulators REG2–REG4, but not the regulator REG1, during a period known by the electronic device when the circuits supplied by the regulators are in a mode consuming a lower than normal current. During this same period the regulator REG1 is still switched on and is connected to supply the outputs OUT2–OUT4 of the switched off regulators such that all the outputs OUT1–OUT4 provide a regulated voltage. The regulators REG2–REG4 can be switched off in various known ways, for example, by controlling the so called power down input of the regulators. This characteristic of a voltage regulator and the methods for switching it off are known by a person skilled in the art. The output voltage of the regulator REG1 which remains powered up when REG2–REG4 are powered down, is switched by the same power down control signal to supply the outputs OUT2–OUT4. In FIG. 4 there are shown switches S1–S3 arranged in the circuit, such that a first contact of the switches is connected to the output of the regulator REG1, and the second contact of the switches is connected to the respective outputs OUT2–OUT4 of the regulators REG2–REG4. These switches may be implemented using various known techniques. One implementation could be the use of MOS transistors to perform the switching action with the power down signal connected to the gate junction enabling switching of the remaining two contacts. When the power down signal is initiated the signal switches off regulators REG2–REG4 and closes the switches S1–S3 such that the output voltage from REG1 is re-directed to supply, in addition to OUT1, regulator outputs OUT2–OUT4. In the power down state there are no currents supplying REG2–REG4 and as a result current is saved and thus a lower power consumption is achieved during periods known by the electronic device. When the circuits supplied by the regulators are in a low power mode, the total power consumption of all circuits connected to the outputs OUT1–OUT4 is low compared to the power supply ability of the single regulator REG1.

Figure 5:
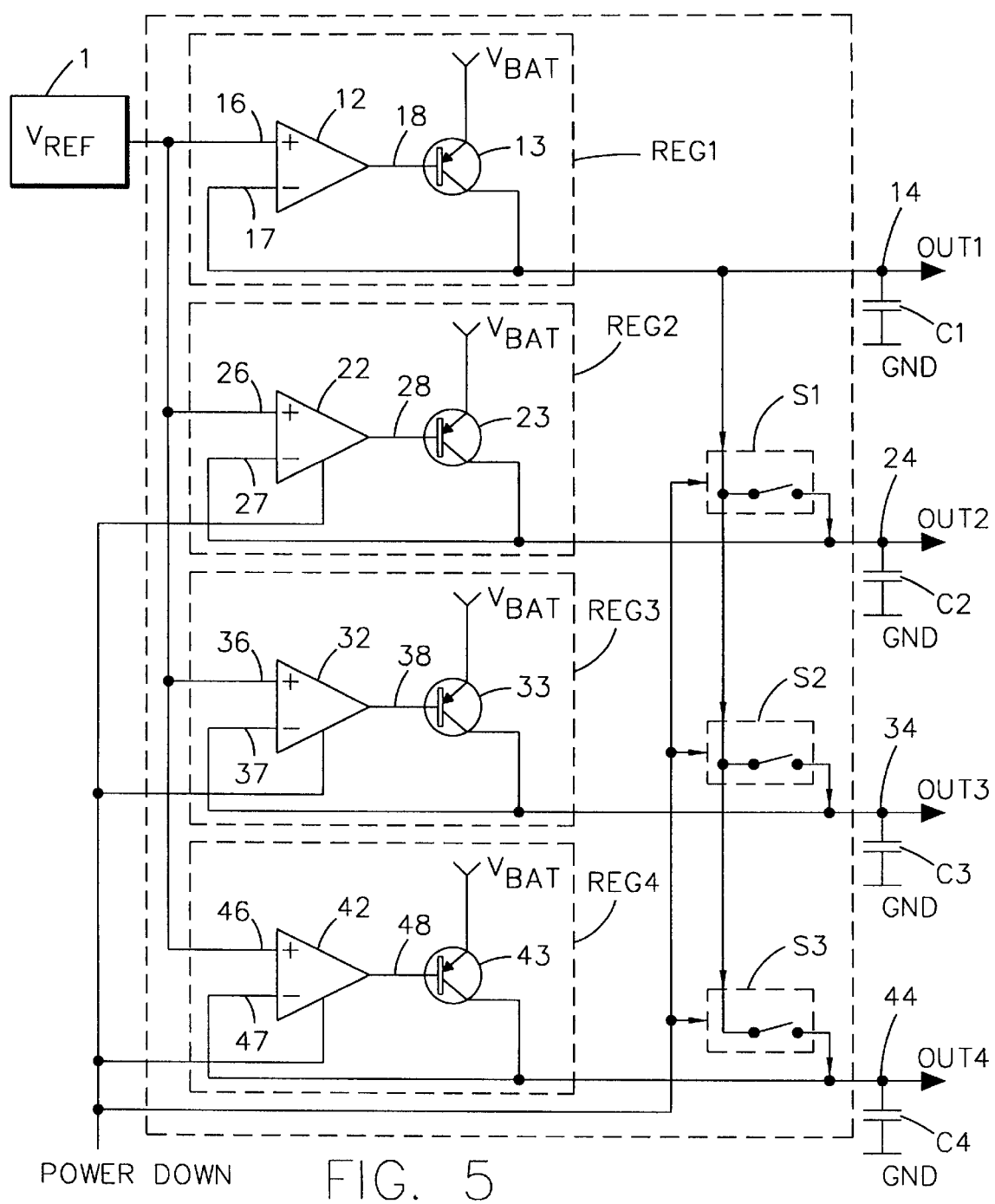
FIG. 5 is a circuit diagram of a combination of voltage regulators in accordance with the invention.

FIG. 5 is as a circuit diagram corresponding to the block diagram of FIG. 4 Here the regulators REG2–REG4 are switched off by controlling the differential amplifiers 22, 32, 42 into a switched off mode, whereby the power down signal is supplied to the differential amplifiers.

Figure 6:
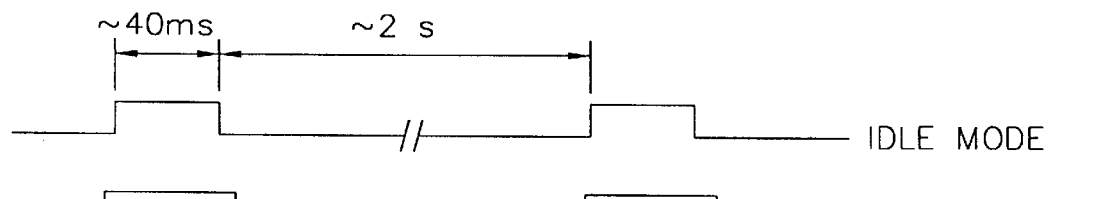
FIG. 6 is a pulse diagram of timings and switchings used in accordance with the invention.

FIG. 6 is a pulse diagram representing the timings of the power down signal. The IDLE MODE pulse diagram shows, for example, how the invention is utilised in a mobile phone. Mobile phone systems use a so called idle mode (listening mode, listening to the paging channel), typically exhibiting a short active state during which a mobile phone receives a paging message from the base station and during which the different circuits have a relatively high power consumption, and a relatively long power down state, during which the mobile phone waits for a paging message and during which the different circuits have a low power consumption. In a GSM telephone the length of the active state is about 40 ms, and the power down state between the active states is in the order of 2 seconds. The power down signal must keep all regulators switched on at least when the electronic device is in the active state, or in the case of the mobile phone, during the active state of the idle mode. In order to ensure that the regulators REG2–REG4 are not inadvertently switched off too early, the power down signal's on-period (pulse high) may be made longer that this active state, as is shown in FIG. 6, so that the power down signal's off-period (pulse low) will be correspondingly shorter than the power down state. Thus, when the electronic device supplies a signal that its circuits are in a low power mode, then the power down signal is switched into the off-period, and the power down signal is switched into the on-period before the circuits of the electronic device again are switched into the active state, so that all regulators REG1–REG4 will be switched on. The solution according to FIGS. 4 and 5, which has four regulators and where all regulators except one are switched off, provides a power consumption of 150 $\mu$A+100 $\mu$A=250 $\mu$A, which is less than half of the normal power consumption (550 $\mu$A). The power down signal shown in FIG. 6 could as well be inverted, e.g. by mounting an inverter in the power down line.

What is claimed is:

1. A method for supplying a regulated voltage to a plurality of discrete circuits in an electronic device comprising a plurality of voltage regulators, having outputs respectively connected to said plurality of discrete circuits, for providing respective regulated voltage outputs thereto, wherein during a non-power saving active state the plurality of voltage regulators provide respective regulated voltage outputs for said plurality of discrete circuits, and in a power saving down state the regulated voltage output of one of said plurality of voltage regulators is connected to the outputs of all of the other voltage regulators to provide the regulated voltage output of said one of said voltage regulators to all of said plurality of discrete circuits and the other voltage regulators have their regulated voltage outputs disconnected from their respective discrete circuits.

2. A method as claimed in claim 1, wherein the regulated voltage outputs of said plurality of voltage regulators are at substantially the same voltage level.

3. A method as claimed in claim 1, wherein during the power saving down state the other voltage regulators are switched to an inactive state in response to a power down signal.

4. A method as claimed in claim 1, wherein the electronic device is a mobile telephone operable in a mobile telephone system.

5. A method as claimed in claim 4, wherein the mobile telephone operates in the power down state during a period substantially corresponding to the period between two successive control channel messages.

6. A method as claimed in claim 1, wherein said plurality of voltage regulators comprises two.

7. A method as claimed in claim 1, wherein said plurality of voltage regulators are included in an operating circuit and comprise less than all of the voltage regulators in said operating circuit.

8. An electronic device comprising:

a plurality of discrete circuits, a plurality of voltage regulators having outputs for respectively providing regulated voltage outputs to said plurality of discrete circuits, first connecting means, operable during a non-power saving active state, for connecting the outputs of said plurality of voltage regulators to respectively provide regulated voltage outputs to said plurality of discrete circuits, and second connecting means, operable during a power down state, for connecting the regulated voltage output of one of said voltage regulators to the outputs of all of the other voltage regulators of said plurality of voltage regulators to provide the regulated voltage output of said one voltage regulator to all of said plurality of discrete circuits, and for disconnecting the outputs of said other voltage regulators from their respective discrete circuits.

9. An electronic device as claimed in claim 8, wherein the second connecting means operable during the power down state is a switchable electrical connection.

10. An electronic device as claimed in claim 8, wherein the electronic device is a radiotelephone.

11. An electronic device as claimed in claim 8, wherein said plurality of voltage regulators comprises two.

12. A electronic device as claimed in claim 8, wherein said plurality of voltage regulators comprise less than all of the voltage regulators in said electronic device.

13. A method to reduce the power consumption of an electronic device comprising at least two voltage regulators, each having an output connection, and at least two discrete circuits respectively connected to the output connections of the at least two voltage regulators for receiving the outputs thereof, characterized in that at least one of the voltage regulators is switched off, and that the output of at least one voltage regulator that is still switched on is connected to the output connection of the at least one voltage regulator which was switched off, in order to supply power to said at least one output connection at a moment when the electronic device is on, but operationally in a passive mode.

14. A method as claimed in claim 13, characterized in that all of the at least two voltage regulators, except for said one voltage regulator that is still switched on, are switched off, and that the output of the one voltage regulator still switched on is connected to the output connections of all of the voltage regulators which were switched off to supply power to said output connections.

15. A method as claimed in claim 13, characterized in that the electronic device is a mobile telephone and that the output of the one voltage regulator still switched on is connected to the output connection of the at least one voltage regulator which was switched off when the mobile telephone is switched into the so called power saving mode.

* * * * *